US009774208B2

(12) United States Patent
Qian et al.

(10) Patent No.: US 9,774,208 B2
(45) Date of Patent: Sep. 26, 2017

(54) NFC ASSISTED WIRELESS CHARGING

(71) Applicant: Cellco Partnership, Arlington, VA (US)

(72) Inventors: Nanjun Qian, Princeton, NJ (US); Yuk Lun Li, Morganville, NJ (US); Christopher M Schmidt, Branchburg, NJ (US); Manuel Enrique Caceres, Basking Ridge, NJ (US)

(73) Assignee: Cellco Partnership, Basking Ridge, NJ (US)

( * ) Notice: Subject to any disclaimer, the term of this patent is extended or adjusted under 35 U.S.C. 154(b) by 703 days.

(21) Appl. No.: 13/913,888

(22) Filed: Jun. 10, 2013

(65) Prior Publication Data

US 2014/0361728 A1 Dec. 11, 2014

(51) Int. Cl.
*H02J 7/00* (2006.01)
*H02J 7/02* (2016.01)
*H02J 50/10* (2016.01)
*H02J 50/00* (2016.01)
*H02J 50/80* (2016.01)
*H02J 50/40* (2016.01)

(52) U.S. Cl.
CPC .............. *H02J 7/025* (2013.01); *H02J 50/00* (2016.02); *H02J 50/10* (2016.02); *H02J 50/40* (2016.02); *H02J 50/80* (2016.02); *H02J 2007/0001* (2013.01)

(58) Field of Classification Search
CPC .... H02J 7/025; H02J 2007/0001; H02J 50/00; H02J 50/10; H02J 50/40; H02J 50/80
USPC .................................................. 320/106, 108
See application file for complete search history.

(56) References Cited

U.S. PATENT DOCUMENTS

| 4,829,404 | A | 5/1989 | Jensen | |
|---|---|---|---|---|
| 2002/0057584 | A1 | 5/2002 | Brockmann | |
| 2007/0277491 | A1 | 12/2007 | Byttebier et al. | |
| 2009/0096413 | A1* | 4/2009 | Partovi | H01F 5/003 320/108 |
| 2009/0246596 | A1 | 10/2009 | Sridhar et al. | |
| 2010/0315197 | A1 | 12/2010 | Solomon et al. | |
| 2011/0184888 | A1* | 7/2011 | Lee | H02J 7/025 705/412 |
| 2012/0007441 | A1 | 1/2012 | John | |
| 2012/0212072 | A1* | 8/2012 | Miyabayashi | H04B 5/0037 307/104 |
| 2012/0274275 | A1 | 11/2012 | Baek | |
| 2013/0057210 | A1 | 3/2013 | Nergaard et al. | |
| 2013/0091225 | A1 | 4/2013 | Eaton | |
| 2013/0203345 | A1* | 8/2013 | Fisher | H04B 1/3816 455/41.1 |
| 2013/0234658 | A1* | 9/2013 | Endo | H02J 7/025 320/108 |
| 2013/0285604 | A1* | 10/2013 | Partovi | H02J 7/0042 320/108 |

(Continued)

FOREIGN PATENT DOCUMENTS

WO    WO2013006004    *    1/2013

*Primary Examiner* — Nathaniel Pelton

(57) ABSTRACT

A charging system may include a charging apparatus having a controller and a power transmitter. The controller may be configured to initiate authentication of a device by communicating with the device via a first electromagnetic field. The transmitter, in response to the authentication, may be configured to transmit power to the device via a second electromagnetic field.

20 Claims, 5 Drawing Sheets

(56) References Cited

U.S. PATENT DOCUMENTS

| | | | |
|---|---|---|---|
| 2013/0285605 A1* | 10/2013 | Partovi | H02J 7/0042 320/108 |
| 2014/0002013 A1 | 1/2014 | Kossi et al. | |
| 2014/0132210 A1* | 5/2014 | Partovi | H02J 5/005 320/108 |
| 2014/0159651 A1 | 6/2014 | Von Novak et al. | |
| 2014/0246920 A1* | 9/2014 | Bae | H02J 5/005 307/104 |
| 2014/0266004 A1 | 9/2014 | Andrews | |
| 2014/0346888 A1* | 11/2014 | Kim | H02J 7/025 307/104 |

* cited by examiner

NFC ASSISTED WIRELESS CHARGING

BACKGROUND INFORMATION

Induction charging may be used to charge the battery of an electronic device, such as a mobile phone, tablet or personal computer. Separate devices, hereinafter referred to as transmitters, may be used to charge these devices when the devices are placed on or near the transmitters and the devices include an appropriate receiver. Traditionally, the device periodically 'wakes-up' and transmits a ping message (also referred to herein as a ping or ping command) in order to detect a nearby transmitter. The device may then be charged by the transmitter. However, the process of waking up, sending a ping, waiting for an answer and perhaps repeating transmission of the ping several times before shutting down again may continually draw on the device's battery power and potentially violate certain power consumption requirements. Further, publicly available systems are relatively inaccessible and currently lack an efficient and secure revenue collecting method to facilitate cost recover for offering induction charging.

BRIEF DESCRIPTION OF THE DRAWINGS

While the claims are not limited to the illustrated examples, an appreciation of various aspects is best gained through a discussion of various examples thereof. Referring now to the drawings, illustrative examples are shown in detail. Although the drawings represent the various examples, the drawings are not necessarily to scale and certain features may be exaggerated to better illustrate and explain an innovative aspect of an example. Further, the examples described herein are not intended to be exhaustive or otherwise limiting or restricting to the precise form and configuration shown in the drawings and disclosed in the following detailed description. Exemplary illustrations of the present invention are described in detail by referring to the drawings as follows.

DETAILED DESCRIPTION

Figure 1:
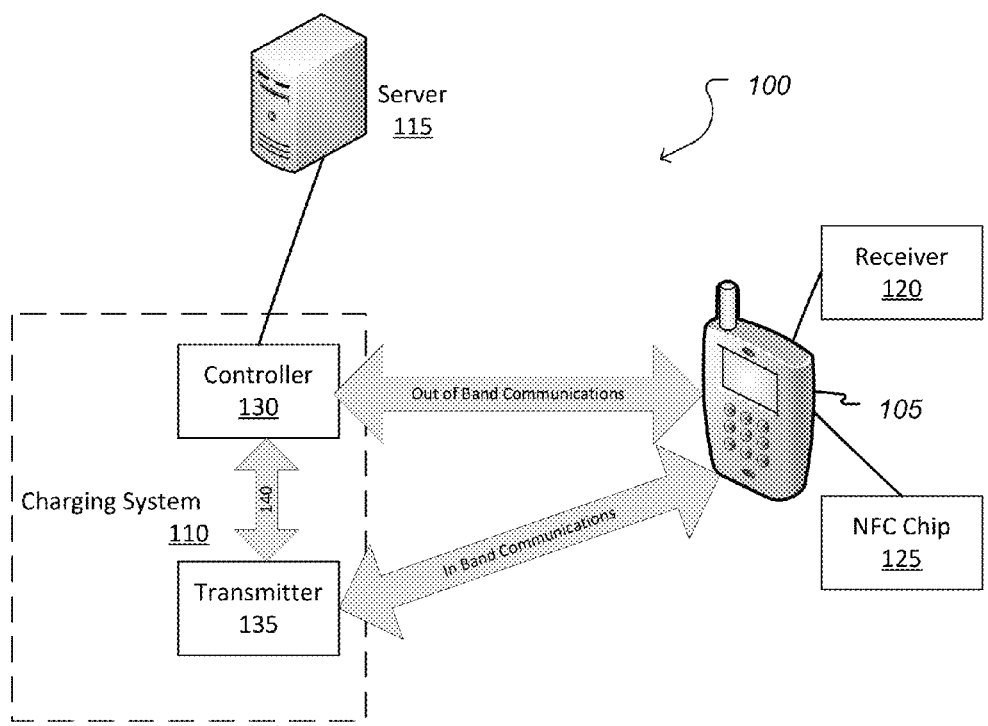
FIG. 1 is a system diagram of the wireless charging system.

Referring now to the discussion that follows and also to the drawings, illustrative approaches to the disclosed apparatuses and methods are shown in detail. Although the drawings represent some possible approaches, the drawings are not necessarily to scale and certain features may be exaggerated, removed, or partially sectioned to better illustrate and explain the disclosed device 105. Further, the descriptions set forth herein are not intended to be exhaustive or otherwise limit or restrict the claims to the precise forms and configurations shown in the drawings and disclosed in the following detailed description.

In a wireless charging arrangement, a transmitter may be configured to charge an electronic device, typically a device having a battery that has been depleted. An induction coil within the transmitter may create an alternating electromagnetic field. The electronic device may have a receiver having a coil. The receiver may be configured to receive power from the electromagnetic field created by the transmitter. The battery may then be charged using the power from the transmitter. The transmitter coil may be configured to resonate at the same frequency as the receiver coil within the device. This may create resonant coupling between the transmitter and device and allow power to be transferred at a greater distance between the device and the transmitter. Thus, a transmitter may charge a device when the two are within a certain distance of each other.

An exemplary charging system may include a Near Field Communication (NFC) controller configured to create a secure channel by which a device may transmit information to be authenticated prior to initiating the power transfer. The controller may generate an electromagnetic field and be capable of reading an NFC tag from a chip within a device. Thus, the device does not need to wake-up and transmit a ping (and receive a response thereto) in order to detect the transmitter. To the contrary, the secure channel is used to receive data from the device, without the device having to 'search' for a power source. Further, the secure channel created by the NFC controller may also allow for payment information to be transmitted securely and without using in-band signaling.

Such a system may be used in public places such as shopping malls, airports, etc., to permit users to charge devices at certain charging stations. These charging stations may allow a device to be authenticated at the NFC controller and then subsequently charged at the transmitter. Some charging stations have a controller for every transmitter, while other charging stations may have several transmitters. That is, a device may be placed on or near the NFC controller (i.e., 'tapped') to be authenticated. Once authenticated, the device may be placed on a transmitter for charging. The device may also provide feedback to the user based on the alignment of the device with the NFC controller and transmitter to best optimized authentication and power transfer.

The device may provide feedback to the user based on the alignment of the device with the NFC controller and transmitter to best optimized authentication and power transfer.

Referring to FIG. 1, a wireless charging system 100 may include an electronic device 105 having a rechargeable power source, a charging system 110 and a server 115. The device 105, while shown as a mobile device, may be a computing device having a processor for executing computer-executable instructions, and a memory and/or other computer readable media for storing data and computer executable instructions. For example, the device 105 may be a smart phone, personal digital assistant, laptop computer, tablet computer, etc. A rechargeable power source, such as a battery may be included in the device 105. The battery may be capable of being charged via inductive charging mechanisms, as described above. The device 105 may include a power receiver 120. The receiver 120 may be integrated within the device 105, or it may be a separate device 105 connected to a charge port of the device 105. It may also be configured to connect to a Universal Serial Bus (USB) port within the device 105. The receiver 120 may include an induction coil configured to receive power transmitted from the charging system 110.

The device 105 may include at least one authentication element, such as a Near Frequency Communication (NFC) chip 125. The NFC chip 125 may be capable of transmitting information to other NFC devices, such as controller 130. Such information may include a device identifier, sensitive financial information and other device and/or user information that may be used by the charging system 110. The NFC chip 125 may be powered by the electromagnetic field created by the controller 130. Upon being woken up by the controller 130, the NFC chip 125 may then transmit the information to the controller 130. Other authentication elements may also be included in the device 105, such as a secure removable card, also known as a secure element (not shown). The NFC chip 125 may interface with the secure element via a proprietary protocol to read information from the secure element within the device 105.

The charging system 110, also referred to as a charging apparatus and charging station, may be a system for charging devices 105. For example, a charging station may be located in an airport terminal and may allow travelers the opportunity to charge their devices while waiting for their flight. The charging system 110 may include a controller 130 and a transmitter 135. The controller 130 may be a NFC controller 130 capable of receiving and transmitting information through a NFC protocol at short distances. NFC may be used to authenticate the device 105, as described in more detail herein. NFC technologies are often capable of creating a secure communication channel and may encrypt the information being transmitted. Information may be exchanged between the NFC controller 130 and the NFC chip 125 within the device 105. When the NFC chip 125 is placed in close proximity to the controller 130, the controller 130 may enable an electromagnetic field to run through the NFC chip 125, thereby 'waking up' the chip 125 within the device 105. Specifically, the device 105 may be 'tapped' to the NFC controller 130. The chip 125 may be woken up by detecting the electromagnetic field via an antenna within the chip 125. The electromagnetic field may be created by a conductor within or in communication with the controller 130. The NFC controller 130 may provide an electromagnetic carrier field whereby the device 105 may draw operating power and charge the battery therein. The NFC chip 125 of the device 105 may, in response to having been woken up, may then transmit information stored in the chip 125 such as device identifiers, personal data, authentication data, financial data, account data, battery power data, etc. The information may be transmitted via an NFC protocol. By allowing the NFC controller 130 to power the chip 125, even if the battery of the device 105 is completely depleted, the chip 125 may still be used for authentication purposes, which are discussed below. The NFC controller 130 may include an NFC reader configured to read the NFC chip 125 and receive the device 105 information.

Figure 4:
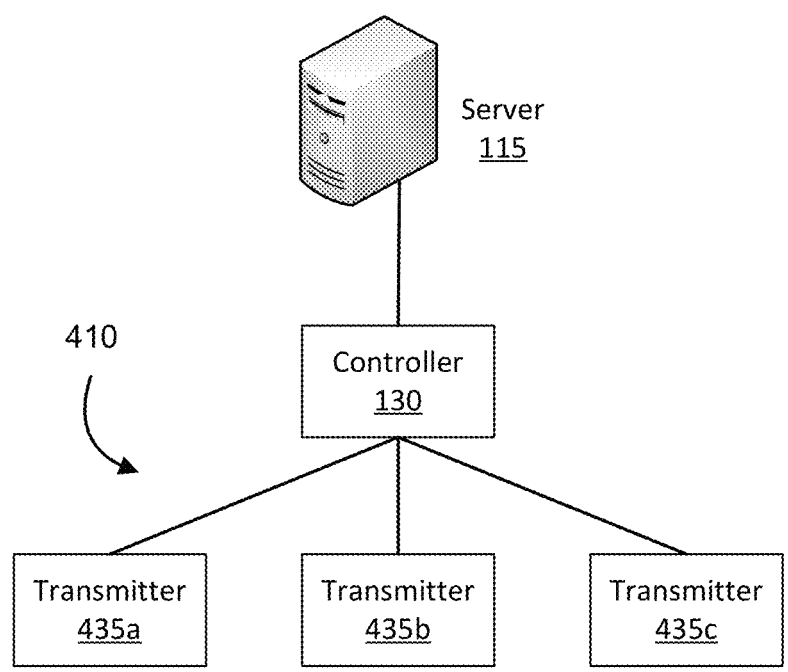
FIG. 4 is a system diagram of a charging system having multiple transmitters.

The transmitter 135 may be part of the charging system 110 and may be configured to charge the device 105. That is, the transmitter 135 and controller 130 may be part of the same device. The transmitter 135 and controller 130 may also be separate devices, as shown in FIG. 4. As explained, the transmitter 135 may include an induction coil configured to create an alternating electromagnetic field. The transmitter coil may be configured to resonate at the same frequency as the receiver coil within the device 105. This may create resonant coupling between the devices 105 and allow power to be transferred at a greater distance between the device 105 and the charging system 110. That is, the transmitter may charge a device in close proximity to it, but without direct contact. In one example, the transmitter may charge a device within the same room as the transmitter. The transmitter 135 may receive commands from the controller 130 instructing the transmitter 135 to charge the device 105. That is, the transmitter 135 may create the electromagnetic field in response to instructions from the controller 130. The instructions may be in response to the controller 130 authenticating the device 105. As mentioned above, the controller 130 may include a conductor for creating a first electromagnetic carrier field for 'waking up' the NFC chip 125 Information may be received from the chip 125 via the first electromagnetic field, or it may be received via a secure out-of-band channel. The transmitter 135 may emit a second electromagnetic field for charging the device 105. The two fields may occupy different frequency ranges selected to avoid interfering with one another.

The transmitter 135 and the controller 130 may communicate with each other via a secure interface 140. The interface 140 may include an input/output system configured to transmit and receive commands and data between the transmitter 135 and controller 130. In an example where the transmitter 135 and controller 130 are separate devices (e.g., FIG. 4), they may communicate with each other using a wireless network such as Wi-Fi, Bluetooth, cellular networks, ad-hoc wireless networks, etc.

The server 115 may be in communication with the charging system 110, and specifically in communication with the controller 130. The server 115 and the charging system 110 may communicate via a wireless network. They may also communicate with each other via a wire, land-line telephone network, cable network, fiber-optic cables, etc.

The server 115 may be a central office of a service provider. The service provider may provide services, (e.g., cellular, Wi-Fi, cable, FiOS, etc.) to the device 105. The server 115 may be configured to maintain a plurality of records associated with the device 105. These records may relate to a service agreement between the device 105 and the service provider and may include device identifiers, personal data, authentication data, financial data, etc.

The server 115 may be configured to further facilitate authentication of a device 105. In one example, the information received from the device 105 at the controller 130 may be sent to the server 115. Such information may include device identifiers, personal data, authentication data, financial data, account data, battery power data, etc. The server 115 may use the information to authenticate the user. That is, based on the device identifier, the server 115 may determine whether the device 105 should be authenticated or recognized based on the received information (e.g., device identifier). The record associated with the device may be used by the server 115 to determine the specific services associated with the device. Additionally or alternatively, the controller 130, upon receiving the information, may transmit the device identifier to the server 115. The server 115 may in turn respond with an authentication response detailing certain record and/or account data associated with the device identifier, such as the type of service/subscriptions the device subscribes to. This record data may be used by the controller 130 to determine whether the device 105 is authorized to be charged by the transmitter 135. The record data may include account data, such as subscription details, received payments, etc., as it relates to the device 105. For example, the account data may identify type of services associated with the device 105. In some examples, the account data may be used when authenticating a device 105. That is, the device 105 may be associated with a subscription for unlimited wireless charging. Other examples of subscriptions may include a certain amount (e.g., time) of charging. In other examples, it is enough that a pre-established relationship between the device 105 and the service provider exists, i.e., the device 105 receives at least some type of service from the service provider.

Certain subscriptions may also allow certain devices to receive preferential charging. This preferential charging may allow a device associated with a preferred subscription to be charged before another device association with a non-preferred subscription. For example, a user may pay for a preferred subscription. This subscription may include various services as discussed herein. The subscription may also allow the user to charge his or her device at various charging stations prior to other non-preferred subscribers. For example, if each transmitter 135 at a charging station is in use, and a queue of devices are waiting to be charged, the device associated with the preferred subscription may move up in the queue and be permitted to be charged prior to other non-preferred devices in the queue.

The controller 130 may manage the queue and communicate with the devices via a wireless network. The controller 130 may send a message to a device indicating that the device may now begin charging at the transmitter 135. The message may be in the form of an SMS (Short Message Service) or MMS (Multimedia Messaging Server) message, and e-mail, etc. The order in which devices may be charged may be maintained by the controller 130 and/or the server 115. The account data associated with each device may define the subscription of each device. This account data may be used to determine the location of each device in the queue. In one example, if multiple devices are currently charging, and three other devices are line to charge, the three devices may be ranked or listed based on their subscriptions. A first device may be associated with a non-preferred subscription, while a second and third device may be associated with preferred subscriptions. Even if the first device has been waiting to be charged longer than the second and third, the second and third devices may be permitted to be charged before the first device.

As shown in FIG. 1, the device 105 may communicate with the charging system 110 using both out-of-band and in-band signaling. That is, two different channels may be used to communicate with the charging system 110. Such channels may be used to transmit an information signal from one device or medium to another. Each channel may have a certain bandwidth or frequency capacity to transmit signals. In the example shown in FIG. 1, out-of-band communications may be used to transmit NFC messages using the NFC protocol and an in-band electromagnetic field may be used to transmit the wireless power from the transmitter 135 to the receiver 120 of the device 105. In-band signaling allows for data to be sent within the same band or channel used for voice transmission. Out-of-band signaling is on a different channel and cannot be heard by users via the voice channel. Due to its security, data transferred over the out-of-band communications may be used for authenticating the device 105. In addition to authenticating the device 105, the NFC controller 130 may be used to 'wake up' the device 105. That is, once the NFC chip 125 of the device 105 enters the carrier field created by the NFC controller 130, the NFC chip 125 may be triggered, upon recognizing the field, to transmit device information to the controller 130. Thus, the carrier field acts as a wake-up signal for the device 105. The NFC controller 130, upon authentication, may then instruct the transmitter 135 to transmit power to the device 105. Because the carrier field is used to power and 'trigger' a response from the NFC chip 125, the device 105 does not need to periodically wake up and search for a transmitter 135. This allows power within the device 105 to be preserved. Moreover, if the battery of the device 105 is completely drained, the controller 130 may still authenticate the device 105 without requiring any power from the device 105. Accordingly, power transfer may be initiated via out-of-band communications and without drawing on the power of the device 105.

The device information may be transmitted initially via an out-of-band channel. As explained, a user may be authenticated using the NFC protocol. Further, once the power transfer has been initiated, information may continue to be transmitted via the out-of-band channel. That is, the NFC chip 125 may continue to transmit device information, include a device identifier to the controller 130. By continually transmitting the device information during charging, the charging system 110 may assure that an authenticated device 105 is using the transmitter services. That is, out-of-band communications may be transmitted while a device 105 is being charged via in-band magnetic resonance. Additionally or alternatively, as described herein, in-band communication may also be used to receive the device information.

By using out-of-band communications to initially recognize the device 105, problems with detecting the device 105 are alleviated. First, if the battery of the device 105 is sufficiently depleted, the device 105 may not be capable of sending out ping commands to detect a trigger. The NFC controller 130 provides enough power to the NFC chip 125 so that the chip 125 may be read and therefore may 'wake-up' the device 105, instead of the device 105 waking up on its own to look for a transmitter autonomously. Further, when using in-band communications, a relatively large load may be placed on the transmitter 135 by the device 105. That is, the charging of the device 105 may create a large draw on the transmitter 135 and may prevent other devices from being detected. For example, a Bluetooth™ device has a relatively small load in comparison with a phone. If a phone is being charged via an in-band channel the transmitter 135 may not be capable of detecting a device that makes use of the transmitter 135 but at a lower load. Thus, when multiple devices 105 are in close proximity to a transmitter 135, some may be essentially undetectable due to the large load caused by the in-band charging. By using an out-of-band channel to transmit information to authenticate each device, the device may be recognized and may in turn be charged by the transmitter 135, or multiple transmitters.

The device 105 may continue to be charged by the transmitter 135 until a trigger event occurs. The trigger event may be any event that is recognized by the controller 130 and may cause the controller 130 to instruct the transmitter 135 to cease charging. In one example, the trigger event may not be specific to the device 105—e.g., time based such that charging is allowed only for predetermined periods per use, independent of the device characteristics once the device is authorized. In one example, the trigger event may be specific to the device 105, e.g. that the device 105 is fully charged. That is, the battery within the device 105 has reached its maximum power capacity. This may be detected by the controller 130 via the device information transmitted via the out-of-band communications. Additionally or alternatively, the controller 130 may receive such indication that the battery is fully charged, or at least charged to a predefined amount set by the user, via the in-band channel. Further the controller 130 may maintain and enforce other limitations other than battery capacity. In one example, the controller 130 may instruct the transmitter 135 to stop charging when a time limit has been reached. Such time limits may be imposed based on the service arrangement with the service provider. The controller 130, as explained, may receive this information from the server 115 and use it to limit the power transmission by the transmitter 135.

Another example of a trigger event specific to the device 105 may be the expiration or limit on charging services as defined in the record data associated with the device 105. For example, some records may establish a certain duration, or quantity of permitted charges. In one example, a device 105 may be permitted to be charged for up to 10 hours a month. Once the limit is reached, charging may not be authorized or additional fees may be incurred. The amount that a specific device 105 has been charged may be calculated based on the start and end times recorded by the controller 130. Each time a device 105 is tapped, it may transmit and/or store the time-stamp. The various time-stamps may be maintained in the device record at the server 115. Additionally or alternatively, the controller 130 may maintain its own record.

A trigger event may also be recognized when the device 105 is no longer authenticated. During charging, the NFC controller 130 may read the NFC chip 125 at predefined intervals. Each time the NFC chip 125 is read, the device information is evaluated. If the NFC controller 130 ceases to authenticate the device 105, the controller 130 may instruct the transmitter 135 to stop charging. This may occur when the device 105 has been removed from the charging system 110. By routinely authenticating the device 105, it prevents the device 105 from being removed from the charging system 110 and another subsequent device 105 taking its place. That is, it prevents an unauthorized device from 'stealing' power from the transmitter 135.

The continual authentication may also be done via in-band signals transmitted over an in-band channel during charging. That is, the device information may be transmitted over the in-band channel instead, or in addition to the device information received over the out-of-band channel. The information sent over the in-band channel may be similar to that sent over the out-of-band channel in that it may include a device identifier and other battery and charging information. The transmitter 135 may be configured to recognize the device identifier and maintain charging as long as the identifier remains constant. In addition to continually authenticating the device 105, the in-band information may be used to inform the transmitter 135 of certain power properties of the device 105 such as the remaining battery power, necessary currents for charging, etc. However, any financial information typically transmitted via NFC may not be sent via the in-band channel, being instead reserved for the more secure out-of-band channel.

In addition to various authentication advantages, the system 100 also provides for enhanced billing and payment options. In one example, as described above, the subscription between the device 105 and the service provider may include wireless power transfer at various charging systems 110. In one example, the service provider may have charging stations in public places such as airports, hotels, shopping centers, banks, etc. The charging stations may allow users to charge their devices 105 at certain kiosks. The user's subscription with the service provider may include these services. Thus, upon authentication, the device 105 may be charged by a transmitter 135 at the charging station. Additionally or alternatively a bill-through system may be enabled by the service provider and charging station. That is, a per-use fee may be incurred for charging. Such fee may be applied to the monthly statement associated with the device 105. Other methods of payment may also be used. In one example, the NFC controller 130 may also be used to authorize payment of the charging service. Regardless of whether a pre-established relationship exists between the device 105 and the server 115, upon tapping of the device 105 to the controller 130, the user of the device 105 may be asked, via a user interface within the device 105, if he or she would like to pay for the charging service with his or her credit card or bank card stored in the NFC chip 125. Thus, non-subscribing devices may also use the charging services, perhaps at an enhanced fee, compared to currently subscribed customers.

Figure 2:
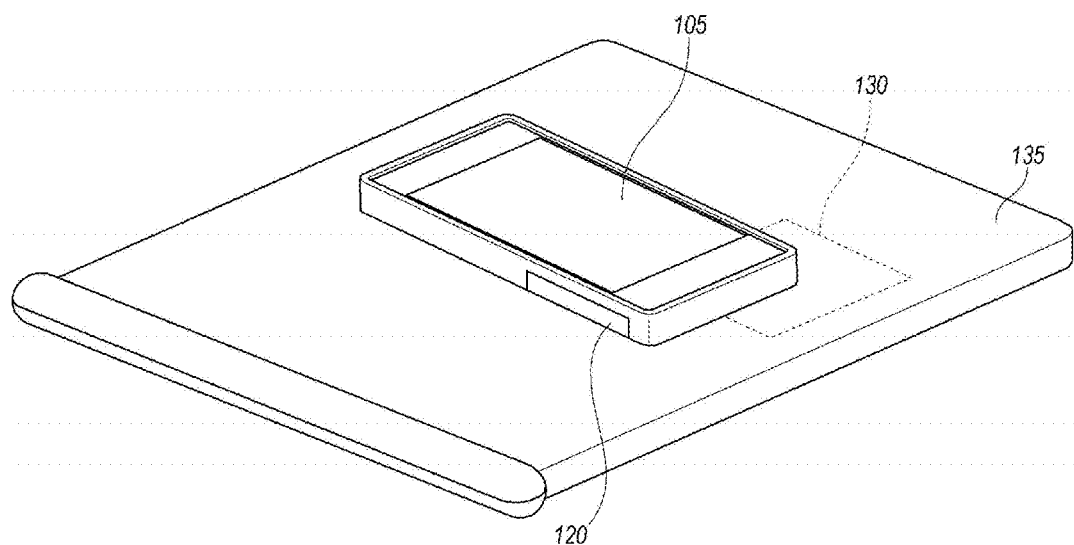
FIG. 2 is a perspective view of an exemplary wireless charging system.

FIG. 2 shows the device 105 being in direct contact with the charging system 110 so that the coil of the receiver 120 is in contact with the transmitter 135. The NFC chip 125 within the device 105 and the NFC controller 130 may also be in contact with one another. However, while the transmitter 135 and the device 105 are shown to be in contact with one another, charging may still occur without the contact. The transmitter 135 may still charge the device 105 as long as the device 105 is within range of the electromagnetic field transmitted by the transmitter 135.

Figure 3:
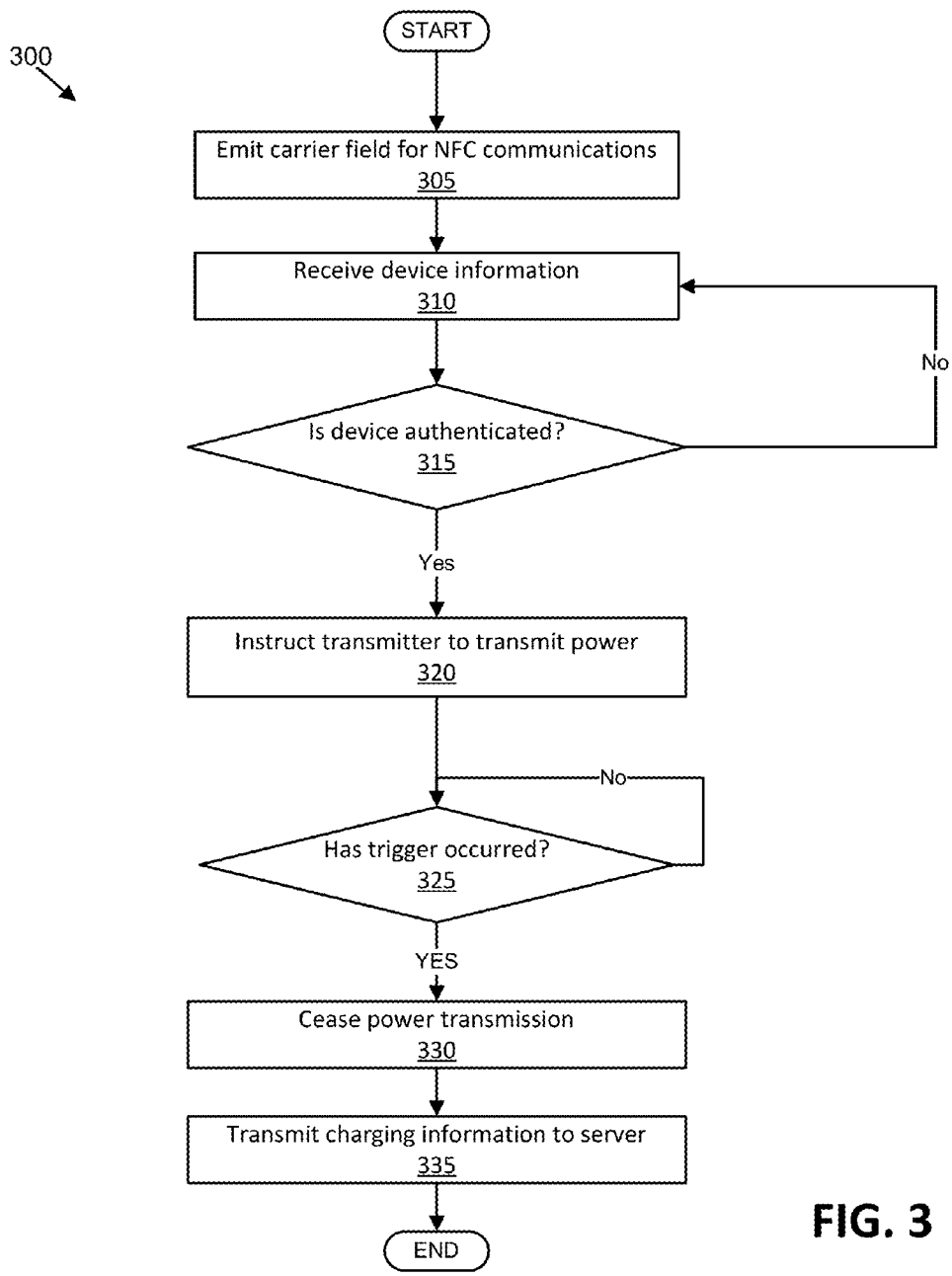
FIG. 3 is a flow chart for an exemplary process for the charging system.

FIG. 3 shows an exemplary process 300 for the system 100. The process begins at block 305. In block 305, the NFC controller 130 emits an electromagnetic carrier field. The device 105 may be 'tapped', or touched, to the NFC controller 130. By doing this, any NFC element, e.g., NFC chip 125, that comes in contact with, or at least in close proximity to, the NFC controller 130 is able to recognize the field and become a transponder capable of being powered by the carrier field. As explained above, this allows the device 105 to be 'woken up' by the carrier, or first electromagnetic field without the device 105 having to periodically wake up and search for a transmitter 135.

In block 310, the controller 130 may receive device information from the device 105 via the NFC chip 125 within the device 105. The NFC controller 130 may acquire device information from the chip 125, which may include device identifiers, personal data, authentication data, account data, financial data, battery power data, etc. This information may be received via a secure channel using out-of-band communications.

In block 315, the controller 130 determines whether the device 105 is authenticated. The device 105 may be authenticated based on the device identifier. It may be enough that the controller 130 recognizes the device identifier as being associated with the service provider. The controller 130 may also use the device identifier to look up the record data and subscriptions associated with the device 105. In one example the controller 130 may transmit the device identifier to the server 115. The server 115 may then return the record associated with the device 105. The controller 130 may determine whether the device 105 may be charged based on the device record. For example, the device 105 may be authenticated for charging based on the subscription associated with the device 105, e.g., unlimited wireless power transmissions. The subscription may also set forth certain geographical limits as well as durational limits. In one example, the subscription may permit for charging in certain geographical locations, e.g., domestic airports, but not others, e.g., international airports.

If the subscription does not include wireless power transfer, the user may authorize such wireless power transfer by paying a fee for the transfer. This fee may be paid using bill-through whereby the fee is applied to the monthly statement associated with the device 105. The fee may also be paid using a credit card or bank card established with the NFC chip 125 or the secure element. The user of the device 105 may authorize such payment via the user interface. For example, in the event that the subscription does not include wireless power transfer, the interface may display a message such as "Wireless power transfer is out of the scope of subscription, would you like to pay for the transfer?" If the user responds in the affirmative, the user interface may generate a list of payment options, such as service provider bill through, NFC authorized charge, or another electronic payment type. If the user of the device 105 decides to pay for the wireless power transfer, the device 105 may then be considered to be authenticated.

Once the device 105 is authenticated, a notification may be realized either at the charging system 110 or at the device 105. In one example, the charging system 110 may emit a sound via a speaker in the system. In another example, the device 105 may pulse, or vibrate. These notifications may provide an indication to the user that authentication has been achieved. Notification may also be realized via the user interface, e.g., via a message such as "Device Authenticated."

The process may proceed to block 320. If the device 105 is not authenticated, the process may return to block 310 until further device information is received.

In block 320, in response to the device 105 being authenticated, the controller 130 may instruct the transmitter 135 to transmit power to the device 105. Power may be transmitted by the coil within the transmitter 135. The coil in the receiver 120 of the device 105 may receive the power and in turn, store the power via the device battery. The power transfer may be facilitated by a second electromagnetic field created by the coils. The second electromagnetic field, as explained above, may be received by a device receiver 120 and used to charge the battery may then be charged using the power from the transmitter.

In block 325, the controller 130 may determine whether a trigger event is recognized. As explained above, a trigger event may be any predetermined event that causes the transmitter 135 to cease its power supply. Exemplary triggers may be battery capacity being reached, time limit being reached, or loss of authentication of the device 105. The controller 130 may receive out-of-band communications from the device 105 in the background of the power transfer. That is, the out-of-band NFC communications may use an additional channel outside of the in-band channel and will not interfere with the power transfer. Additionally or alternatively, in-band signals could be relied on for detecting the trigger event. For example, the battery capacity may be communicated to the transmitter 135 via in-band channel, as well as the device identifier.

In addition to the examples above, a break in power transmission may also be a detectable trigger event. If a device 105 were to be removed from the transmitter 135, the transmitter 135 may detect the loss of resonance and therefore cease to supply an electromagnetic field. Once this occurs, the device 105 may be required to be re-authenticated by the controller 130 before power transfer may resume. This may prevent a device 105 from leaving the transmitter 135 and being replaced by another, non-authorized device.

If a trigger event has been detected, the process proceeds to block 330. If not, the process continues to charge the device 105 and stays at block 325.

At block 330, the controller 130 instructs the transmitter 135 to cease power transfer. The transmitter 135 may enter a sleep mode until the transmitter 135 is again woken up by the controller 130 and instructed emit power.

At block 335, once power transfer has ceased, charging information may be transmitted to the server 115 by the controller 130. Additionally or alternatively, the controller 130 may maintain the charging information. The charging information may include certain information such as the start and stop time of the charging session. It may also include the selected payment type (if any), as well as other device specific factors such as throttling information (e.g., the variances in how a battery is charged wherein it may charge quickly at first and slow down as capacity is reached.)

The process then ends.

FIG. 4 is an exemplary diagram of a charging system 410 having multiple transmitters 435 in communication with the controller 130. In this exemplary system 400, one controller 130 may be configured to control multiple transmitters 435. For example, transmitters may be embedded at a charging station at an airport. These charging stations may have one NFC controller 130 and multiple transmitters 435 so that multiple devices may be charged simultaneously. The transmitters 435 may be arranged under tables or seats within the airport terminals.

In operation, a user may 'tap' his or her device 105 at the controller 130. Once the device 105 has been authenticated, a notification may be realized (e.g., chime, vibration, message on the device interface) indicating that the user may proceed to place the device 105 on one of the transmitters 435. It may not immediately be known to the charging system 410 which transmitter 435 will charge the device 105. In one example, the device 105 may be charged at an available transmitter 435 not currently being occupied by another device. In another example, one transmitter 135 may actually include multiple transmitters. That is, a single charging plate may include multiple transmitter coils each configured to receive a device 105.

Because the NFC controller 130 does not necessarily know which transmitter 135 will eventually charge the device 105, several methods may be used to ensure the device 105 is charged, without allowing un-authorized devices to 'piggy back' the power transfer. That is, authenticating one device will not allow multiple devices to be charged simply because there are additional available transmitters. In one example, once the device 105 is authenticated, the controller 130 may instruct the transmitters 435 to emit power. However, the authenticated device 105 may be placed on only one of the transmitters 435, such as transmitter 435a. Upon being placed on the transmitter 435a, the coil of the receiver 120 within the device 105 being to receive power. The transmitter 435a may be configured to detect that the receiver 120 is receiving power by the resonance created by the two coils. The transmitter 435a may continue to transmit power until a trigger event is detected. In this example, where the device 105 is not within NFC range of the controller 130, the trigger event may be removal of the device 105 from the transmitter 435. That is, the transmitter 435a may be configured to emit power as long as a device 105 is in resonance with the transmitter 435. Once resonance is broken, the device 105 may need to again be authenticated to resume power transfer.

In another example, the transmitters 435 may emit electromagnetic fields for a predetermined amount of time after authentication, e.g., for 30 seconds. Once that time has expired, if the transmitter 435 has not received device information associated with the device 105 via the in-band channel, power transmission may cease. That is, unless the device 105 is recognized by a transmitter 435, the transmitter may turn off and enter sleep mode.

Each transmitter 435 may be capable of recognizing resonance individually of the other transmitters 435 associated with the controller 130. That is, the lack of resonance at one transmitter 435 may act as a trigger event for that transmitter 435, without affecting the others. In the above example, where the device 105 is authenticated, all of the transmitters 435 may begin to emit an electromagnetic field. The device 105 may be placed on the transmitter 435a. After a predetermined amount of time has passed, resonance may not be detected at transmitters 435b and 435c and they may cease to emit power. Thus, the trigger event is independent for each transmitter 435. This may decrease the possibility of non-authorized power transfer.

By having one controller 130 associated with multiple transmitters 435, costs may be reduced and efficiencies may be increased. For example, only one controller 130 may be configured to be in communication with the server 115. However, with each authenticated device 105, the transmitters 435 may emit power and allow for multiple devices 105 to be authenticated by a single controller 130 and charged concurrently.

Accordingly, a NFC enhance wireless charging system 110 is disclosed whereby it is not necessary for the device 105 to continually 'wake-up' to detect a transmitter 135. A dual-band system allows for the device 105 to be recognized and authenticated via NFC technologies using out-of-band communications. Moreover, once authenticated, the controller 130 may instruct the transmitter 135 to charge the device 105. The device 105 will be charged until a trigger event is detected, at which the controller 130 with instruct the transmitter 135 to cease charging. Service provider bill through and subscriptions may be used to generate a fee for the charging services. Additionally, other NFC enabled payment mechanisms, such as credit cards and bank accounts may be used to pay for the charging service.

In other embodiments, visual, auditory and/or tactile feedback may be provided to optimize alignment of the NFC chip 125 with the controller 130, increasing efficiency for initial transfer of the in-band information and reducing the likelihood of having to repeatedly move around to find a position of adequate alignment. In order to find the optimum spot, a user interface on the device 105 or controller 130 may provide guidance to allow the user to know how close the device 105 is in both the x/y direction to the optimum position.

In various implementations, the user interface may indicate the power level or the magnetic flux between the NFC chip 125 and the controller 130. For example, an indicator associated with the user interface may indicate graphically the intensity of the field, such as a growing circle, a power bar, signal level digits etc. For cases where the device 105 is in standby or is off, an LED may be used. For example, a power LED indicator of the device 105 or another "NFC" LED indicator may be used. As the user moves the handset through the electromagnetic field, the LED may change intensity, colors, and/or blink rate to indicate the "hot" or "cold" spot of the field.

Figure 5:
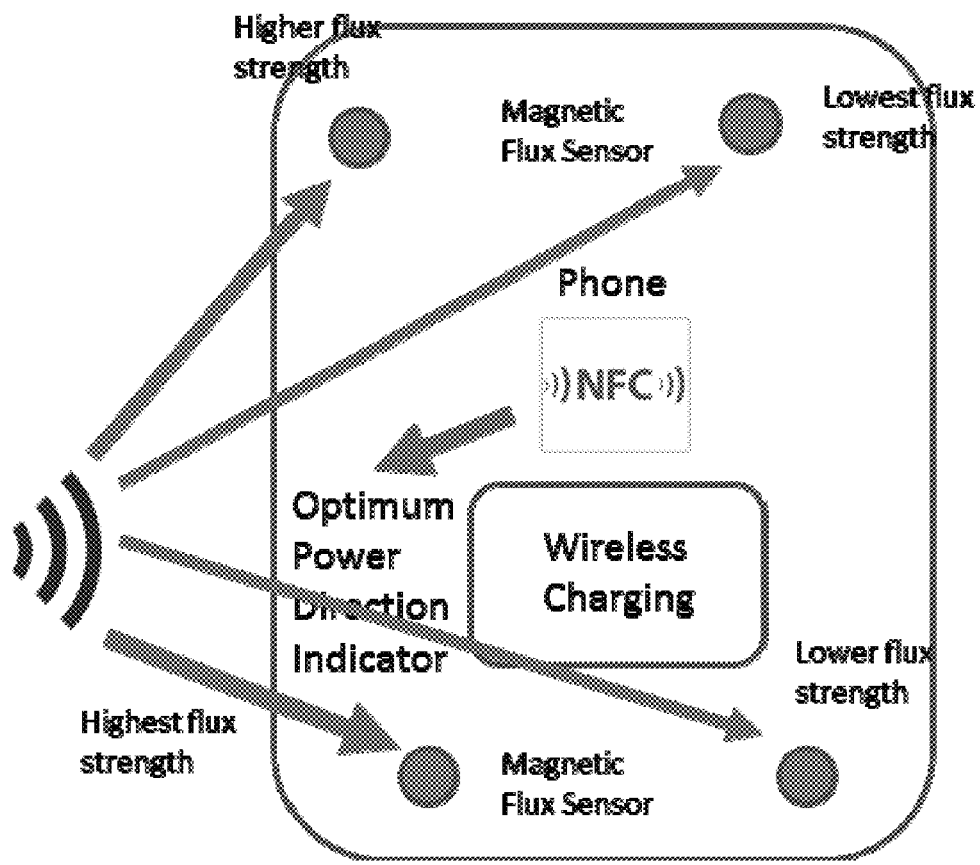
FIG. 5 is a system diagram of a device having sensors enabling optimized positioning of the NFC interactions.

Alternatively, the direction of field strength change may be indicated. Sensors that detect magnetic flux may be added to the device 105. In particular, strategically placed sensors such as those of FIG. 5 may indicate the direction of increasing field strength. In this case, if the device 105 is on, the user interface may indicate field strength plus a directional indicator of increasing field strength. Again, if the device 105 is off, LED indicators can be used. With the directional indicator, the user can move the device towards the direction of increasing field strength. Other sensors, such as an accelerometer, gyrometer, and/or magnetic sensor may be used to detect the device directional motion in relation to rate of change in flux density (rate of change of signal strength, the magnetic field strength is inversely proportional to $r^3$, where r is distance). This information can be used to enhance the detection of the (direction of the) source in relation to the device. The controller may transmit a field strength indicator of a first electromagnetic field to the device indicating the location of the controller 130 relative to the NFC chip 125 of the device 105.

Such a system may also be used to enhance NFC mobile payments, e.g., those through ISIS.

In general, computing systems and/or devices, such as device 105, charging system 110, server 115, and controller 130, may employ any of a number of computer operating systems, including, but by no means limited to, versions and/or varieties of the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OS X and iOS operating systems distributed by Apple Inc. of Cupertino, Calif., the BlackBerry OS distributed by Research In Motion of Waterloo, Canada, and the Android operating system developed by the Open Handset Alliance. Examples of computing devices include, without limitation, a computer workstation, a server, a desktop, notebook, laptop, or handheld computer, or some other computing system and/or device.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein, may include various kinds of mechanisms for storing, accessing, and retrieving various kinds of data, including a database, a set of files in a file system, an application database 150 in a proprietary format, a relational database 150 management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

What is claimed as new and desired to be protected by Letters Patent of the United States is:

1. A system comprising:
a charging apparatus having a controller and a plurality of power transmitters with respective transmitter coils,
wherein the controller is configured to initiate authentication of a device by communicating with the device via a first electromagnetic field, the device having a device coil;
wherein the transmitter, in response to the authentication, is configured to transmit power from the respective transmitter coils to the device coil via a second electromagnetic field different from the first electromagnetic field so long as an individual resonance is detected for each of the respective transmitter coils; and
wherein the controller, in response to a predefined trigger event set by a user and at least one of the detected individual resonances, is configured to instruct at least one of the plurality of power transmitters to limit power transmission without limiting transmission of the other of the plurality of power transmitters.

2. The system of claim 1, wherein the first electromagnetic field is created by the controller and wherein the second electromagnetic field is created by the plurality of power transmitters.

3. The system of claim 1, wherein the authentication of the device includes an exchange of information between the controller and the device, wherein the information includes an identifier associated with the device and recognized by the controller.

4. The system of claim 3, wherein the information is transmitted via a secure out-of-band channel that is not a voice channel and wherein the second electromagnetic field from the respective transmitter coils to the device coil is transmitted via an in-band channel including the voice channel.

5. The system of claim 4, further comprising a server in communication with the controller and configured to receive at least a portion of the information from the controller, wherein the portion of the information is used to authenticate the device.

6. The system of claim 5, wherein the server is configured to transmit an authentication response to the controller and in response to receiving the authentication response the controller instructs at least one of the plurality of power transmitters to transmit power, wherein the authentication response is transmitted in response to the server determining that a pre-established relationship exists between the device and the server.

7. The system of claim 3, wherein the controller is configured to transmit a wake-up signal to the device via the first electromagnetic field, wherein the first electromagnetic field is a carrier field configured to provide power to an authentication element within the device.

8. The system of claim 1, wherein the transmitter is configured to transmit power to the device until a trigger event is recognized by the controller.

9. A method comprising:
emitting a first electromagnetic field at a charging apparatus within a secure channel;
receiving device information on the secure channel;
authenticating a device associated with the device information, the device having a device coil;
instructing, in response to the authentication, a plurality of power transmitters having respective transmitter coils to emit to the device coil a second electromagnetic field distinct from the first electromagnetic field for charging the device so long as an individual resonance is detected for each of the respective transmitter coils; and
instructing, in response to a predefined trigger event set by a user and at least one of the detected individual resonances, at least one of the plurality of power transmitters to limit power transmission without limiting transmission of the other of the plurality of power transmitters.

10. The method of claim 9, further comprising transmitting the device information to a server associated with a service provider.

11. The method of claim 10, wherein the authenticating the device includes recognizing the device as having a pre-established relationship with the service provider.

12. The method of claim 9, wherein the authenticating the device includes reviewing account data associated with the device.

13. The method of claim 9, further comprising instructing at least one of the plurality of power transmitters to cease emission of the second electromagnetic field in response to a trigger event being recognized.

14. The method of claim 13, further comprising transmitting a field strength indicator of the first electromagnetic field to the device.

15. A non-transitory computer-readable medium tangibly embodying computer-executable instructions comprising:
   instructing a charging apparatus to emit a first electromagnetic field at a charging apparatus within a secure channel;
   receiving device information on the secure channel;
   authenticating a device associated with the device information, the device having a device coil;
   instructing, in response to the authentication, a plurality of power transmitters having respective transmitter coils to emit a second electromagnetic field distinct from the first electromagnetic field for charging the device so long as an individual resonance is detected for each of the respective transmitter coils; and
   instructing, in response to a predefined time limit set by a user and at least one of the detected individual resonances, at least one of the plurality of power transmitters to limit power transmission without limiting transmission of the other of the plurality of power transmitters.

16. The medium of claim 15, further comprising transmitting the device information to a server associated with a service provider.

17. The medium of claim 15, wherein the authenticating the device includes recognizing the device as having a pre-established relationship with the service provider.

18. The medium of claim 16, wherein the authenticating the device includes reviewing account data associated with the device.

19. The medium of claim 15, further comprising instructing at least one of the plurality of power transmitters to cease emission of the second electromagnetic field in response to a trigger event being recognized.

20. The medium of claim 19, wherein the trigger event is a loss of authentication of the device.

* * * * *